United States Patent
Mandorf, Jr. et al.

[15] 3,660,027
[45] May 2, 1972

[54] HIGH PURITY HOT PRESSED BORON NITRIDE

[72] Inventors: Victor Mandorf, Jr., Olmsted Falls; Lionel C. Montgomery, North Olmsted, both of Ohio

[73] Assignee: Union Carbide Corporation, New York, N.Y.

[22] Filed: May 6, 1969

[21] Appl. No.: 822,214

[52] U.S. Cl. .................................................. 23/191
[51] Int. Cl. ........................................... C01b 21/06
[58] Field of Search ..................................... 23/191

[56] References Cited

UNITED STATES PATENTS

| 2,808,314 | 10/1957 | Taylor | 23/191 |
| 3,058,809 | 10/1962 | Taylor | 23/191 |
| 3,241,918 | 3/1966 | Lenihan et al. | 23/191 |
| 3,420,629 | 1/1969 | Lubatti et al. | 23/191 |

FOREIGN PATENTS OR APPLICATIONS

| 483,201 | 4/1938 | England | 23/191 |
| 1,073,936 | 6/1967 | England | 23/191 |

OTHER PUBLICATIONS

Ingles et al., " The Preparation & Properties of Boron Nitride," from Special Ceramics, pp. 144– 167, Academic Press (1960).

*Primary Examiner*—Oscar R. Vertiz
*Assistant Examiner*—Charles B. Rodman
*Attorney*—Paul A. Rose, Robert C. Cummings and John S. Piscitello

[57] ABSTRACT

High purity boron nitride articles of manufacture having a high density and improved properties. The improved boron nitride articles have a unique acicular crystal structure, an oxygen content of less than 0.5 percent by weight, a density of at least 1.9 grams/cc., excellent hot strength, low and substantially isotropic coefficients of thermal expansion with no irreversible thermal expansion, excellent thermal shock resistance, moisture insensitivity and improved dielectric properties. These articles are produced by treating conventional hot pressed boron nitride articles with a suitable solvent to lower their boron oxide ($B_2O_3$) content, and then sintering the treated material in an inert atmosphere at a temperature of from 1,600° C. to 2,100° C. in the absence of pressure or mechanical restraint.

12 Claims, 2 Drawing Figures

HIGH PURITY HOT PRESSED BORON NITRIDE

BACKGROUND OF THE INVENTION

1. Field of the Invention

This invention relates to high purity boron nitride articles. More particularly this invention relates to high purity hot pressed boron nitride articles of manufacture having a high density and improved properties.

2. Description of the Prior Art

Boron nitride articles are generally fabricated by press-molding and sintering techniques. The techniques employed are broadly classified as:

a. The hot pressing method: wherein sintering (at 1,700°C. to 2,200°C.) is carried out simultaneously with the pressure molding process.

b. The cold pressing method: wherein press molding is first carried out, and then sintering is carried out.

A modification of the cold pressing method is disclosed in United Kingdom Pat. No. 1,073,936 whereby cold pressed boron nitride powder is sintered by heating in a mold without the application of pressure but while free expansion of the boron nitride due to heating is restricted by the mold.

Boron nitride articles produced by the hot pressing method of fabrication have a high boron oxide ($B_2O_3$) content. While this material acts as a binder during hot-pressing and allows such articles to be hot pressed from boron nitride, it also causes a weakening of the properties of the hot pressed articles. Thus, because of the presence of this material, hot pressed boron nitride articles are weak at high temperatures (flexural strengths of about 3,000 psi. or lower at 1,000° C.), exhibit a permanent expansion upon heating to 1,800° C. and cooling to room temperature of close to 1 percent or more, and pick up sufficient moisture (which chemically combines with the boron oxide present to produce boric acid) under normal humidity conditions to cause cracking if the boron nitride is exposed to a rapid rise in temperature. These properties have restricted the use of boron nitride produced in this manner in many high temperature applications where a strong material with reversible thermal expansion and high thermal shock resistance is required.

Boron nitride articles produced by the cold pressing method are of low density (about 1.5 grams/cc. to 1.6 grams/cc.) and low flexural strength (about 3000 psi. from room temperature to 1,000° C.). DUring the sintering stage the cold pressed material undergoes a thermal expansion which remains even after the product is cooled to room temperature. This permanent expansion is caused by the presence of boron oxide ($B_2O_3$) and is of the order of 4.5 to 5 percent when sintering temperatures of 1,500°C. to 2,100°C. are employed. Further, because of the expulsion of boron oxide ($B_2O_3$) during sintering, it has not been possible to produce cold pressed articles greater than ¼ inch to ½ inch in thickness (smallest dimension) without cracking them.

While United Kingdom Pat. No. 1,073,936 attempts to overcome the irreversible thermal expansion which cold pressed boron nitride undergoes when it is heated to sintering temperatures (and thereby increase its density) by conducting this operation while restricting the free expansion of the boron nitride in a mold, this method has only been successful in raising the bulk specific gravity of such materials from 6 to 9 percent to as high as 1.705. Furthermore, the pressure exerted by the escape of boron oxide ($B_2O_3$) during sintering is usually sufficiently great to crack the mold as well as the boron nitride piece itself. In addition, this method does not produce any significant increase in flexural strength over that of conventional cold pressed boron nitride.

United Kingdom Patent Specification 777,000 reports that hot pressed boron nitride articles having an apparent density in excess of 1.9 grams/cc. can be produced by hot pressing boron nitride particles which had previously been heated in an ammonia atmosphere to reduce the boron oxide content ($B_2O_3$). Boron nitride articles produced in this manner are reported as having a free boron oxide ($B_2O_3$) content of as low as 1.67 percent. Attempts by the patentees to lower the boron oxide ($B_2O_3$) content of such hot pressed articles by heating to 2,100° C. without the application of pressure resulted in rupturing of the bodies. This rupture was attributed by the patentees to the failure to confine the body in a mold while heating. This experiment demonstrates that boron nitride articles hot pressed from boron nitride which has been treated to reduce its boron oxide ($B_2O_3$) content prior to hot pressing still rupture upon heating to high temperatures and are unsuitable for high temperature uses.

Pyrolytic boron nitride having a density in excess of 1.90 grams/cc. has been produced by the reaction of boron trichloride and nitrogen. However, this method has been unsuccessful in producing articles greater than ¼ inch to ½ inch in thickness (smallest dimension.) Furthermore, the properties of this material are extremely anisotropic in nature. Thus, for example, this material has a flexural strength of about 15,000 psi. at room temperature perpendicular to the direction of the layer planes but below 2500 psi. parallel to the layer planes. The coefficient of thermal expansion parallel to the direction of the layer planes is about $1 \times 10^{-6}/°$ C. to 1,800° C. compared to about $25 \times 10^{-6}/°$ C. to 1,800° C. perpendicular to the layer planes.

SUMMARY OF THE INVENTION

In accordance with the instant invention it has now been discovered that very high purity boron nitride articles having a high density and a unique acicular crystal structure can be obtained by treating hot pressed boron nitride articles with a suitable solvent to lower their boron oxide ($B_2O_3$) content and then sintering the treated material in an inert atmosphere at a temperature of from 1800°C. to 2,100° C. in the absence of pressure or mechanical restraint. Because of the manner in which these articles are prepared, it is for the first time possible to prepare large structural shapes of boron nitride e.g., having a thickness [smallest dimension] in excess of 1 inch) having a very low boron oxide ($B_2O_3$) content and high density. These shapes are characterized by a unique combination of properties not hitherto found in any available form of boron nitride including excellent hot strength, low and substantially isotropic coefficients of thermal expansion with no irreversible thermal expansion, excellent thermal shock resistance, moisture insensitivity and improved dielectric properties.

The improved boron nitride articles of the instant invention have an oxygen content of less than 0.5 percent by weight and a density of at least 1.9 grams/cc., generally from 1.9 grams/cc. to 2.1 grams/cc. While conventional hot pressed boron nitride is characterized by a decrease in flexural strength as it is heated to temperatures up to about 900° C., the hot pressed boron nitride of the instant invention is characterized by an uninterrupted increase in flexural strength with increasing temperatures up to about 2,000° C. The decrease in flexural strength of conventional hot pressed boron nitride up to temperatures of about 900° C. is caused by the presence of relatively large amounts of boron oxide ($B_2O_3$) which melts at 525°C. and weakens the bonds of the hot pressed article causing a sharp drop in flexural strength of from up to about 15,000 psi. at room temperature to about 3000 psi. or less at 900°C. Cold pressed boron nitride, on the other hand, has a lower boron oxide ($B_2O_3$) content and its flexural strength remains constant at about 3000 psi. when heated from room temperature to 1,000° C. The low flexural strength of this material is attributed to its low density. By contrast, hot pressed boron nitride treated according to the instant invention increases in flexural strength from about 6,000 psi. at room temperature to as high as 17,000 psi. or more at 2,000° C. At 1,000°C., the flexural strength of this material is greater than about 6000 psi. vs. about 3,000 psi. or less for both conventional hot pressed and cold pressed boron nitride. At 2,000° C., the flexural strength of the treated hot pressed boron nitride increases to as high as 17,000 psi. or more vs. about 8,000 for the untreated hot pressed boron nitride.

Because of the elimination of boron oxide ($B_2O_3$), the treated hot pressed boron nitride articles of the instant invention undergo no measurable irreversible thermal expansion when heated to 1,800°C. and subsequently cooled to room temperature. By way of contrast, conventional hot pressed boron nitride articles undergo a permanent expansion of close to 1 percent or more under these conditions. The absence of permanent expansion of the hot pressed boron nitride articles of the instant invention and their low thermal expansion characteristics (coefficient of thermal expansion: parallel to the direction of hot pressing, below $2 \times 10^{-6}/°C$. to 1800°C.; perpendicular to the direction of hot pressing, below $3 \times 10^{-6}/°C$. to 1,800°C. vs. greater than $4 \times 10^{-6}/°C$. to 1,800°C. and $8 \times 10^{-6}/°C$. to 1,800°C., respectively, for conventional hot pressed boron nitride) makes these materials extremely resistant to thermal shock and suitable for use at very high temperatures. While pyrolytic boron nitride also exhibits no permanent expansion after heating to 1,800°C. and a coefficient of thermal expansion in the direction parallel to the layer planes of about $1 \times 10^{-6}/°C$. to 1,800°C., this material is extremely anisotropic in character and its coefficient of thermal expansion in the direction perpendicular to the layer planes is about $25 \times 10^{-6}/°C$. to 1,800°C.

The elimination of boron oxide ($B_2O_3$) from the treated boron nitride articles of the instant invention renders these materials extremely insensitive to moisture. As a result they pick up less than 1 percent by weight moisture when exposed to 100 percent relative humidity for 100 hours at room temperature. Thus, after exposure to the aforesaid conditions, the moisture content of such articles has been measured as about 0.8 – 0.9 percent by weight. After standing for 72 hours at room temperature at 37 to 45 percent relative humidity, the moisture content drops to about 0.2 percent by weight. Conventional cold pressed boron nitride exhibits similar moisture insensitivity, but when conventional hot pressed boron nitride is treated under the same conditions, it picks up in excess of 2 percent by weight moisture at 100 percent relative humidity and still possesses at least about 0.5 percent by weight moisture content after standing for 72 hours at room temperature at 37 to 45 percent relative humidity. While the boron nitride of the instant invention completely loses absorbed water on heating, the moisture absorbed by conventional hot pressed boron nitride chemically combines with the boron oxide ($B_2O_3$) present in this material to form boric acid which on heating causes spalling of the hot pressed boron nitride by the rapid explusion of water at critical temperatures up to about 300°C.

The improved dielectric properties of the boron nitride articles of the instant invention are also attributed to the low boron oxide ($B_2O_3$) content of these materials. Typically these materials are characterized by a loss tangent of less than 0.0006 up to 1,000°C. and less than 0.005 up to 1,400°C. as compared to, for example, loss tangents of more than 0.003 at 1,000°C. and more than 0.010 at 1,400°C. for conventional hot pressed boron nitride at 4.44 to 4.53 GHz ($10^9$ cycles/second). At the latter temperature, the improved boron nitride articles of the instant invention exhibit an increase of less than 5 percent in dielectric constant (4.24 at 1470°C. vs. 4.08 at 25°C.). Further, because of the moisture insensitivity of the boron nitride articles of the instant invention, the electronic properties of these materials are substantially unaffected after long exposure to the atmosphere. On the other hand, moisture absorption greatly interferes with the dielectric properties of conventional hot pressed boron nitride causing unpredictable variations in loss tangent and reducing the attractiveness of this material for electronic applications, particularly at high temperatures. Dielectric properties of a specimen of boron nitride prepared in accordance with the instant invention are set forth in Table I below.

TABLE I

Dielectric Properties

| T°C | K (Dielectric Constant) | Tan Δ (Dissipation Factor) |
| --- | --- | --- |
| | At 8.52 GHz | |
| 25 | 4.04 | 0.00025 |
| | At 4.44 to 4.53 GHz | |
| 25 | 4.08 | 0.00026 |
| 113 | 4.08 | 0.0003 |
| 185 | 4.09 | 0.0005 |
| 322 | 4.09 | 0.00055 |
| 423 | 4.10 | 0.00040 |
| 530 | 4.11 | 0.00035 |
| 659 | 4.12 | 0.00040 |
| 752 | 4.13 | 0.00045 |
| 863 | 4.13 | 0.00050 |
| 943 | 4.14 | 0.00050 |
| 1021 | 4.15 | 0.00055 |
| 1096 | 4.16 | 0.00080 |
| 1170 | 4.16 | 0.0013 |
| 1219 | 4.17 | 0.0019 |
| 1287 | 4.18 | 0.0034 |
| 1373 | 4.19 | 0.0040 |
| 1427 | 4.20 | 0.0028 |
| 1446 | 4.22 | 0.0023 |
| 1460 | 4.24 | 0.0044 |
| 1470 | 4.24 | 0.0046 |

The high purity hot pressed boron nitride of the instant invention like conventional boron nitride, whether hot pressed, cold pressed or pyrolytic, can be widely utilized because of its excellent combination of properties such as high thermal conductivity, chemical resistance, high electrical insulation, machinability, nontoxicity and inability to be wet by many molten metals and halide salts. In addition, this novel material can be prepared in structural shapes of a size not possible from cold pressed or pyrolytic boron nitride. Furthermore, because of its low dissipation factor over a wide temperature range this material is well suited for use as microwave and radar dielectric components (radar windows) whereas high loss factors present a serious problem when conventional hot pressed boron nitride is used as the dielectric. In addition, its increased moisture insensitivity, high temperature stability and excellent thermal shock resistance render it useful as plasma arc insulation.

DESCRIPTION OF THE PREFERRED EMBODIMENT

Figure 1:
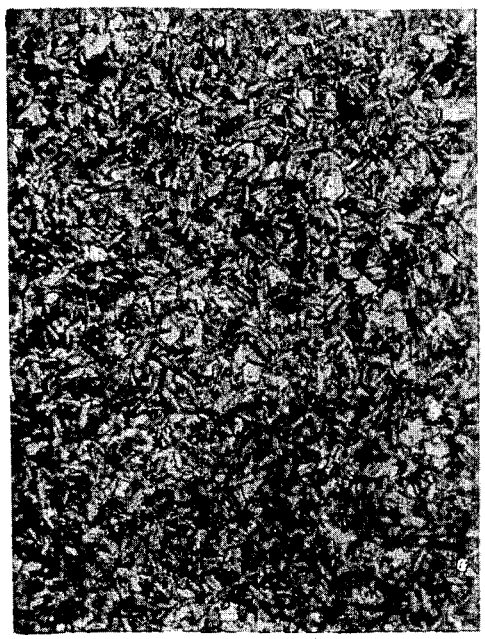
FIG. 1 is a photomicrograph having a magnification factor of 500 of the surface of a sample of boron nitride which had been hot pressed at a temperature of 1,800°C. under a pressure of 2,000 psi. and then soaked in methanol to remove boron oxide ($B_2O_3$) and dried. The view is parallel to the direction of hot pressing.
Figure 2:
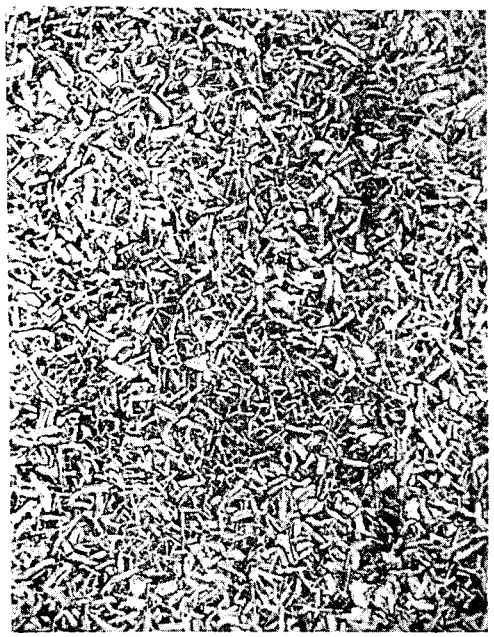
FIG. 2 is a photomicrograph having a magnification factor of 500 of the surface of a sample of boron nitride which had been hot pressed at a temperature of 1,800°C. under a pressure of 2,000 psi., soaked in methanol to remove boron oxide ($B_2O_3$), dried, and then sintered at 2,000°C. by the process of the instant invention. The view, as in FIG. 1, is parallel to the direction of hot pressing. The crystal structure of the sample is acicular compared to the more plate-like structure of FIG. 1.

The high-purity high density boron nitride articles of the instant invention are produced by first treating conventional hot pressed boron nitride articles to lower their boron oxide ($B_2O_3$) content, and then sintering the treated material in an inert atmosphere at a temperature of from 1,800°C. to 2,100°C. in the absence of pressure or mechanical restraint. In order to obtain boron nitride articles having the unique properties described it is necessary to substantially completely remove boron oxide ($B_2O_3$) from the conventional hot pressed boron nitride article employed before sintering.

Substantially complete removal of boron oxide ($B_2O_3$) from the conventional hot pressed boron nitride articles employed is effected according to the process of the instant invention by immersing the hot pressed material in a solvent capable of dissolving or reacting with boron oxide ($B_2O_3$) to form soluble reaction products until it undergoes no further weight loss. The time required to effect removal of boron oxide ($B_2O_3$) will depend upon the size of the boron nitride piece and the particular solvent employed. When methanol is employed as solvent, soaking for 4 days has been found necessary for boron nitride cylinders one-half inch in diameter, 18 days for cylinders 1 inch in diameter, and 44 days for cylinders 2½ inches in diameter. With agitation of the methanol solvent, these times can be lowered to 1 day for boron nitride cylinders one-half inch in diameter, 4 days for cylinders 1 inch in diameter, and 20 days for cylinders 2½ inches in diameter.

Among the solvents which can be employed to effect removal of boron oxide ($B_2O_3$) are water and alcohols, including primary, secondary and tertiary alcohols. The most preferred alcohols are those alcohols containing up to about four carbon atoms. Illustrative of the alcohols which can be employed are aliphatic alcohols such as methanol, ethanol, propanol, isopropanol, butanol, isobutanol, heptanol, octanol, glycerol, and the like, and aromatic alcohols such as benzyl alcohol, phenethyl alcohol and the like. When water is employed as solvent, the boron nitride piece should not exceed one-half inch in diameter in order to effect a complete removal of boron oxide ($B_2O_3$). The addition of a small amount of a strong acid such as hydrochloric acid to the water helps speed up the dissolution of the boron oxide ($B_2O_3$).

After immersion in a suitable solvent, the hot pressed boron nitride is first dried by heating and then further heated in the absence of pressure or mechanical restraint in an inert atmosphere at a sintering temperature in the range of from 1,800°C. to 2,100°C. By an inert atmosphere is meant an atmosphere which is nonreactive with boron nitride under the heating conditions employed. Inert gases such as nitrogen, helium, neon, argon, krypton, xenon, ammonia, and the like, provide suitable atmospheres in which hot pressed boron nitride may be sintered. Temperatures of from 1,950°C. to 2,050°C. are preferred as the highest flexural strengths are obtained at such temperatures. The sintering temperature should not be permitted to exceed 2,100°C. as decomposition of the boron nitride occurs above such temperature. Where lower flexural strengths are tolerable, e.g., about 3,500 psi. at room temperature (perpendicular to pressing direction), sintering temperatures as low as 1,600°C. can be employed. Sintering should be continued for about at least 1 hour, preferably at least 2 hours, to obtain the highest flexural strengths.

The following example is set forth for purposes of illustration so that those skilled in the art may better understand this invention and it should be understood that it is not to be construed as limiting this invention in any manner.

EXAMPLE 1

A cylindrical boron nitride plug 14 inches long and 14 inches in diameter which had been hot pressed at a temperature of 1,800°C. under a pressure of 2,000 psi. was machined to produce a number of smaller boron nitride pieces, including one 3 inch × 2 inch 0.5 inch in size. This piece was dried by heating at 200°C., weighed, and then immersed in flowing water until no further loss in weight occurred. A period of 14 days was required to being the boron nitride piece to constant weight. During this time the piece was periodically removed from the water, dried at 200°C. and weighed to determine if any further loss in weight had occurred. The loss in weight was due to the removal of boron oxide ($B_2O_3$) and amounted to 5.2 percent of the original weight of the piece. The flexural strength of the piece after being brought to constant weight was 950 psi. at room temperature (perpendicular to pressing direction).

After the boron nitride piece had been brought to constant weight, it was heated to 2000°C. under an atmosphere of flowing argon over a period of 4⅔ hours (3 hours to heat from room temperature to 1500°C., 1⅔ hours to heat from 1,500°C. to 2,000°C.) and maintained at this temperature for 2 additional hours. At the end of this time the piece was weighed again and found to have undergone a further weight loss of 0.85 percent.

A cylindrical piece of boron nitride 6 inches long and 2½

TABLE II

| | BN hot-pressed at 1,800° C. and 2,000 p.s.i., treated in water and sintered at 2,000° C. | BN hot-pressed at 1,800° C. and 2,000 p.s.i., treated in methanol and sintered at 2,000° C. | BN hot-pressed at 1,800° C. and 2,000 p.s.i. | BN hot-pressed at 2,000° C. and 2,000 p.s.i. | BN containing 1.65% oxygen hot-pressed at 1,800° C. and 2,000 p.s.i. | BN cold-pressed at 30,000 p.s.i. and sintered at 2,000° C. | Pyrolytic BN |
|---|---|---|---|---|---|---|---|
| Oxygen content (wt. percent) | 0.3 | 0.3 | 2.9 | 3.0 | 1.65 | 0.3 | 0 |
| Density, grams/cc | 1.9 | 2.0 | 2.1 | 2.1 | 2.0 | 1.6 | 2.2 |
| Flexural strength, p.s.i.: | | | | | | | |
| (A): | | | | | | | |
| 25° C | | | | | | | |
| 1,000° C | | | | 15,200 | 12,700 | | (***) |
| 1,500° C | | | | 2,500 | | | (***) |
| 2,000° C | | | | | | | (***) |
| (B): | | | | | | | (***) |
| 25° C | 6,064 | 6,000 | 12,600 | 14,300 | 10,900 | 3,272 | 15,000 |
| 1,000° C | 6,361 | 7,100 | 2,800 | 2,500 | 3,000 | 3,000 | 17,000 |
| 1,500° C | 9,331 | 9,000 | 2,800 | | | | 19,000 |
| 2,000° C | 14,779 | 17,000 | 8,000 | | | | 37,000 |
| Coefficient of thermal expansion × $10^{-6}$/° C. (room temp. to 1,800° C.): | | | | | | | |
| (A) | 0.83 | 0.72 | 6.5 | 4.4 | 1.7 | | 1.0 |
| (B) | | 1.95 | 9.15 | 8.3 | 4.4 | 1.39 | 25.0 |
| Percent permanent expansion after heating to 1,800° C.: | | | | | | | |
| (A) | 0 | 0 | 1.0 | 0.7 | 0.02 | 0.05 | 0 |
| (B) | 0 | 0 | 1.5 | 1.4 | 0.45 | | 0 |
| Moisture pickup after exposure to 100% relative humidity for 100 hrs. at room temp., wt. percent | 0.85 | 0.9 | 3.15 | *2.48 | *2.49 | 0.79 | 0 |
| Moisture content after exposure to 100% relative humidity for 100 hrs. at room temp. and 37-45% relative humidity for 72 hrs., wt. percent | | 0.2 | 0.8 | **2.03 | **.90 | 0.21 | 0 |

(A) = Measured parallel to pressing direction or the direction of the layer planes in the case of pyrolytic BN.
(B) = Measured perpendicular to pressing direction or across the layer planes in the case of pyrolytic BN.
*140 hours exposure.
**140 hours at 100% relative humidity and 16 hours at 37-45% relative humidity.
*** Piece cannot be made in sufficient thickness to measure.

inches in diameter which had been hot pressed at a temperature of 1800°C. under a pressure of 2000 psi was sintered as described above after having been immersed in methanol for 44 days to bring it to constant weight. The loss in weight in methanol amounted to 3.3 percent while the loss in weight during sintering amounted to 0.47 percent. The flexural strength of the piece after being brought to constant weight in methanol but before sintering was 980 psi. at room temperature (perpendicular to pressing direction).

The properties of the two sintered boron nitride pieces are set forth in Table II below and compared to the properties of a like hot pressed boron nitride piece which had not been treated with water or alcohol and sintered at 2000°C., an untreated piece hot-pressed at 2000°C. and 2000 psi., a boron nitride piece hot pressed at 1800°C. and 2000 psi. from boron nitride containing 1.65 percent by weight oxygen, a boron nitride piece cold pressed at 30,000 psi. and sintered at 2000°C., and a piece of pyrolytic boron nitride.

When a boron nitride piece about 0.3 inch thick which had been hot pressed at 1,800°C. and 2000 psi. was exposed to atmospheric conditions for a week and heated to white heat as rapidly as possible with an acetylene torch (heating time to white heat approximately 30 seconds), the surface of the piece exploded into powder and small chunks. The explosion was caused by the expulsion of water resulting from the decomposition of boric acid present in the boron nitride.

When a similar piece of hot pressed boron nitride which had been treated in water and sintered in accordance with the process of the instant invention was treated in a similar manner by heating three times to white heat and quenching twice in cold water no deterioration of the piece occurred.

When a cylindrical piece of boron nitride 5 inches long and 3½ inches in diameter which had been cold pressed under a pressure of 20,000 psi. was heated to 2000°C. in a mold without the application of pressure under an atmosphere of flowing argon over a period of 5 hours (400°C./hour) and then maintained at this temperature of 2 additional hours, the pressure exerted by the escape of boron oxide ($B_2O_3$) during heating caused the mold to crack. Upon cooling, the boron nitride piece was removed from the mold and reheated in a furnace to 2000°C. as previously described. The product so produced was found to have a density of 1.6 grams/cc., a flexural strength of 2600 psi. at room temperature parallel to the pressing direction, and a flexural strength of 2500 psi. at room temperature perpendicular to the pressing direction.

What is claimed is:

1. A process for producing boron nitride articles of manufacture having an oxygen content of less than 0.5 percent by weight and a density of at least 1.9 grams/cc. which comprises treating hot pressed boron nitride with a solvent capable of removing boron oxide therefrom until said hot pressed boron nitride undergoes no further weight loss, drying the hot pressed boron nitride by heating, and sintering the dried treated boron nitride in an inert atmosphere at a temperature of from 1,600° C. to 2,100° C. in the absence of pressure.

2. A process as in claim 1 wherein the solvent is selected from the group consisting of water and alcohols.

3. A process as in claim 1 wherein the solvent is methanol.

4. A process as in claim 1 wherein the solvent is water and the thickness of the hot pressed boron nitride does not exceed one-half inch.

5. A process as in claim 1 wherein the sintering temperature is from 1,800° C. to 2,100° C.

6. A process as in claim 5 wherein the solvent is selected from the group consisting of water and alcohols.

7. A process as in claim 5 wherein the solvent is methanol.

8. A process as in claim 5 wherein the solvent is water and the thickness of the hot pressed boron nitride does not exceed one-half inch.

9. A process as in claim 1 wherein the sintering temperature is from 1,950° C. to 2,050° C.

10. A process as in claim 9 wherein the solvent is selected from the group consisting of water and alcohols.

11. A process as in claim 9 wherein the solvent is methanol.

12. A process as in claim 9 wherein the solvent is water and the thickness of the hot pressed boron nitride does not exceed one-half inch.

* * * * *